United States Patent
Berkey et al.

(10) Patent No.: US 6,233,387 B1
(45) Date of Patent: May 15, 2001

(54) BROADBAND PULSE-RESHAPING OPTICAL FIBER

(75) Inventors: George E. Berkey, Pine City; Alan F. Evans, Beaver Dams; V. Srikant, Ithaca, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/436,017

(22) Filed: Nov. 9, 1999

Related U.S. Application Data

(60) Provisional application No. 60/110,412, filed on Nov. 30, 1998.

(51) Int. Cl.[7] .............................. G02B 6/02; H04J 14/00
(52) U.S. Cl. ........................ 385/123; 385/124; 385/126; 385/27; 359/115
(58) Field of Search .................... 385/27, 28, 31, 385/39, 123, 126, 127, 141, 142, 144, 124; 359/115, 116

(56) References Cited

U.S. PATENT DOCUMENTS

| | | | |
|---|---|---|---|
| 5,329,607 | * 7/1994 | Kamikawa et al. | 385/123 |
| 5,504,829 | 4/1996 | Evans et al. | 385/123 |
| 5,579,428 | 11/1996 | Evans et al. | 385/124 |
| 5,581,647 | * 12/1996 | Onishi et al. | 385/123 |
| 5,589,969 | 12/1996 | Taga et al. | 359/124 |
| 5,648,863 | 7/1997 | Leidenbaum | 359/154 |
| 5,649,044 | * 7/1997 | Bhagavatula | 385/124 |
| 5,696,615 | 12/1997 | Alexander | 359/134 |
| 5,802,235 | * 9/1998 | Akasaka | 385/123 |
| 5,838,867 | * 11/1998 | Onishi et al. | 385/123 |
| 5,854,871 | * 12/1998 | Akasaka | 385/123 |
| 6,031,955 | * 2/2000 | Mukasa et al. | 385/123 |
| 6,072,929 | * 6/2000 | Kato et al. | 385/123 |

FOREIGN PATENT DOCUMENTS

| | | | |
|---|---|---|---|
| 2227110 | 7/1998 | (CA) | 385/123 X |
| 0 598 554 | 5/1994 | (EP) | 385/123 X |
| 0 762 159 | 3/1997 | (EP) | 385/123 X |
| 98 04941 | 2/1998 | (WO) | 385/123 X |

OTHER PUBLICATIONS

V.A. Bogatyrev et al., "A Single–Mode Fiber with Chromatic Dispersion Varying Along the Length", Journal of Lightwave Technology, vol. 9, No. 5, May 1991, pp. 561–566.

H.H. Kuehl, "Solitons on an Axially Nonuniform Optical Fiber", Journal of Optical Society of America B, vol. 5, No. 3, Mar. 1988, pp. 709–713.

K. Tajima, "Compensation of Soliton Broadening in Nonlinear Optical Fibers with Loss", Optics Letters, Jan. 1987, vol. 12, No. 1, pp. 54–56.

* cited by examiner

Primary Examiner—Brian Healy
(74) Attorney, Agent, or Firm—Robert L. Carlson

(57) ABSTRACT

A pulse-reshaping optical fiber having a core with refractive index $n_c$ surrounded by a cladding layer, the diameter of the core changing monotonically along the length of the fiber. The core includes a central region having a maximum refractive index $n_1$ and a moat region disposed radially adjacent to the central region. The moat region has a minimum refractive index $n_2$ which is sufficiently low that the index delta $\Delta_2$ of the moat region with respect to $n_c$ is not greater than −0.1%. The moat region affects the change in dispersion with respect to fiber cladding diameter, as well as providing the pulse-reshaping fiber with low dispersion versus wavelength slope. The pulse-reshaping fiber is particularly useful in association with optical transmission systems where high transmission rates and narrow pulse widths are desired, including components such as high pulse rate wavelength-division-multiplexers (WDMs) and optical regenerators.

23 Claims, 6 Drawing Sheets

BROADBAND PULSE-RESHAPING OPTICAL FIBER

RELATED APPLICATIONS

This application claims the benefit of U.S. Provisional Application No. 60/110,412, filed Nov. 30, 1998, pending.

BACKGROUND OF THE INVENTION

1. Field of the Invention

The present invention relates generally to pulse-reshaping optical fibers and transmission systems utilizing such fibers, and particularly to a pulse-compressing optical fiber.

2. Technical Background

There exists a need for a cost-effective way to increase the information-carrying capacity of optical transmission systems. The term "optical transmission system" refers to any system that uses optical signals to convey information across an optical waveguiding medium such as a single-mode optical fiber. Such optical systems include, but are not limited to, telecommunications systems, cable television systems, and local area networks (LANs). Wavelength-division-multiplexing (WDM) has been employed to increase the capacity of optical transmission systems. A WDM system employs a plurality of optical signal channels, with each channel being assigned a particular channel wavelength. In a WDM system, signal channels are generated, multiplexed, and transmitted over the optical transmission fiber. At the receiving end, the optical signal is demultiplexed such that each channel wavelength can be individually routed to a designated receiver.

Time-division-multiplexing (TDM) has also been employed to increase the capacity of optical transmission systems by decreasing the width of the temporal window used to represent a binary bit of data. The upper capacity limit of TDM occurs when the transmitter electronics is incapable of generating pulses narrow enough to satisfy a predetermined pulse rate. For example, the given system might not be able to transmit pulses at a single wavelength channel data rate of more than 40 Gb/s. In order overcome this limitation and increase the data rate for a return-to-zero (RZ) modulation format, the output pulse train from the light source can be sent through a pulse compressor before being injected into the optical transmission line. The pulse compressor narrows the pulse width, permitting more pulses to be transmitted within a given time period. Conversely, on the receiver end of the transmission line, a pulse-shaping device expands the pulses to their original shape.

During transmission, pulses can disperse or widen as the signal travels along the fiber, resulting in pulses which eventually overlap if they are not initially spaced apart sufficiently. This dispersion similarly limits the data rate capacity of the fiber, and the ability to utilize time-division-multiplexing. Different approaches have been used to overcome dispersion, including dispersion-decreasing fibers and soliton pulses which maintain their characteristic shape when transmitted over long distances. Pulse compression can occur intrinsically in an axially-nonuniform optical fiber (a fiber whose dispersion decreases monotonically from one end to the other), with dispersion decreasing approximately exponentially with distance to attain soliton propagation.

This type of pulse-reshaping relies on a slight imbalance between the competing self-phase modulation (SPM) and dispersion effects in the fiber. For pulse compression, the fiber is designed to have a small residual amount of uncompensated SPM, causing a pulse frequency chirp that decreases the energy in the tails of the pulse via dispersion. For pulse expansion, the fiber is designed to have a small residual amount of uncompensated dispersion, causing a frequency chirp of the opposite sign that increases the energy in the tails of the pulse via SPM. Propagation in the opposite direction changes a pulse-compressing fiber to a pulse-expanding fiber. It has been shown numerically that if the reshaping is allowed to occur adiabatically (slowly) on the scale of the "dispersive length," then all the energy of the original pulse is transferred to the reshaped pulse and no dispersive waves are generated. The adiabatic condition means that the product of the rate of change of the pulse width times the dispersive length must be much less than unity. In practice, the fiber length L should be such that $$2 L_D < L < 10 L_D \tag{1}$$

where $L_D$ is the "dispersive length." The dispersive length is given by $$L_D = T_o^2/|\beta_2| \tag{2}$$

where $T_o$ is the 1/e characteristic pulse width of the optical field, and the group velocity dispersion $\beta_2$ in ps$^2$/nm is given by the equation $$\beta_2 = -\lambda^2 D/2\pi c \tag{3}$$

where $\lambda$ is the wavelength, D is dispersion in units of ps/nm-km, and c is the speed of light. For a hyperbolically-shaped soliton, the full-width half-maximum $T_{fwhm}$ of the pulse equals 1.763 ($T_o$). Thus, $$L_D = [T^2_{fwhm} \cdot 2\pi c]/[(1.763)^2 \cdot D\lambda^2] \tag{4}$$

Taking the optical transmission window centered at 1550 nm wavelength as an example, the dispersive length $L_D$ would be approximately ($T^2_{fwhm}/4D$) at the wavelength of 1550 nm. If the dispersion D at the input end of a pulse compression fiber (z=0) is 10 ps/nm-km, and the full-width half-maximum value $T_{fwhm}$ is 8 ps, then the dispersive length $L_D$ would be 1.6 km. The length L of the compression fiber would then be determined by relationship (1). The minimum and maximum lengths given by relationship (1) in this example would be 3.2 km and 16 km, respectively. Length L should not be made longer than the length necessary to achieve the desired pulse compression, because longer lengths would unnecessarily increase system loss. A particularly suitable fiber length is that which adiabatically compresses the pulse and is approximately 5 $L_D$. For the above example, this length is about 8 km.

Fiber length L would therefore normally be much greater than $2L_D$ for optimum performance. However, shorter lengths (L down to $2L_D$) could be used if the output pulse train was spectrally enhanced device before the pulse train is injected into the input end of the pulse compression fiber. Such spectral enhancement can be accomplished using a sufficiently long length (about 1–2 km) of dispersion-shifted (DS) single-mode optical fiber to cause self phase modulation.

Prior pulse-compression/expansion schemes in axially-varying fiber have used two approaches: 1) fiber whose diameter continuously changes along its length to impart the desired dispersion-decreasing profile; or 2) fiber composed of many alternating segments of fibers having high and low anomalous dispersion which, in effect, spatially separate the SPM and dispersion-reshaping components. In either case, the fiber has employed either a step-index profile (as in standard nondispersion-shifted fiber) or one of various dispersion-shifted transmission fiber profiles. All commercially-available fibers suffer from the same rather large dispersion slope of at least 0.04 ps/nm²-km, which limits the wavelength range over which useful pulse compression can be achieved in an optical transmission system.

The pulse-reshaping fiber should be operative over a large range of wavelengths. For example, it is highly desirable to have a reshaping fiber that operates over the entire erbium (Er) amplification band. In that case, a single fiber could take the broad wavelength output from a wavelength-division-multiplexed array of electro-absorption modulators and simultaneously compress all wavelength channels to the same required pulse width. Such an integrated and compact device would be very useful for high data rate transmission.

The pulse-reshaping fiber should also be operative over a large range of pulse widths and compression factors. The compression factor is defined as the ratio of input to output pulse widths. If the adiabatic condition is met, the effective area of the fiber is approximately constant, and the dispersion exponentially decreases along the fiber with a decay rate equal to the sum of the loss rate α of the fiber per kilometer and the rate ρ at which the pulse width decreases over distance. This means that the rate of dispersion change must be greater than the loss rate in order to compress the pulse as it propagates. However, dispersion is also a function of wavelength. The linear component of this dependence is known as dispersion slope. High dispersion slope implies a large dispersion change. Therefore, fibers with high dispersion slope exhibit a compression factor having a large wavelength dependence. One representative example of such a DS fiber profile is disclosed in U.S. Pat. No. 5,504,829, having a dispersion slope of 0.08 ps/nm-km (given an initial pulse width of 8 ps, fiber loss of 0.2 dB/km, fiber length of 10 km, and input pulse power equal to the fundamental soliton power). If this fiber were designed for four times (4×) compression by exponentially varying the dispersion from 10 to 1.55 ps/nm-km at 1550 nm, then due to the dispersion slope at 1570 nm the dispersion would vary from 11.6 to 3.15 ps/nm-km, and the compression factor would be 2.3. Moreover, at 1530 nm the dispersion would vary from positive 8.4 to negative 0.05 ps/nm-km, and the compression factor would become virtually impossible to approximate. Numerical simulations are required to fully illustrate the associated problems of dispersion slope. Solving the nonlinear Schödinger equation, the output pulse width at 1550 nm wavelength is 2.0 ps, whereas it is 1.6 ps at 1530 nm, and 3.11 ps at 1570 nm. This corresponds to compression factors of 4×, 5×, and 2.6× for 1550 nm, 1530 nm, and 1570 nm, respectively. Not only are the compression factors different, but pulse distortion occurs at smaller wavelengths where the output pulse width is shorter. This can be shown graphically, for example with reference to FIG. 1 herein, where the output pulses at 1550 nm, 1570 nm, and 1530 nm are represented by curves 12, 14, and 16, respectively, plotted against the input pulse 10 for comparison. The temporal output intensity of a conventional soliton pulse is plotted for the three wavelengths in logarithmic scale for FIG. 1(a) and linear scale for FIG. 1(B), with the numerals depicting curves in FIG. 1(b) being primed. The logarithmic scale reflects the differences in the low-intensity tails of the pulse at the three wavelengths, whereas the linear scale demonstrates the differences in the peak intensity and widths of the pulses at each of the three wavelengths.

These differences are a direct consequence of finite dispersion slope, especially near the output end of the fiber. Pulse distortion in a transmitter leads to dispersive wave generation, and an undesirable continuous-wave background. The above example demonstrates that high dispersion slope is detrimental to optical signal transmission where broad wavelength band compression and narrow pulse output are desired.

The broadband problem introduced by high dispersion slope fiber can be overcome by utilizing different high-slope pulse-compression fibers for each input channel of the WDM system, but tuning each fiber to have the same initial dispersion and rate of change. However, this solution is commercially unacceptable, as it greatly increases the amount of pulse compression fiber required for the system, and overly complicates the design and manufacture of the system.

Even if an optical transmission system utilized only one wavelength channel, it would still be advantageous to employ a pulse-compression fiber having low slope, since finite slope acts to distort the pulse shape (especially for short pulses near the zero-dispersion wavelength in the fiber).

To quantify the requirement on dispersion slope needed to maintain the desired pulse-reshaping performance over a broad wavelength range, consider the wavelength variation on the ratio of input to output dispersion at other wavelengths:

$$D(\lambda_C,L)/D(\lambda_C,0)\times[D(\lambda_C,0)+(\lambda_C-\lambda_E)S(\lambda_C,0)]/[D(\lambda_C,L)+(\lambda_C-\lambda_E)S(\lambda_C,L)]>(1-\eta) \qquad (5)$$

where $\lambda_C$ is the center wavelength of the operating window, $\lambda_E$ is the wavelength at the edge of the operating window, $D(\lambda,z)$ is the dispersion at wavelength $\lambda$ and length z, $S(\lambda,z)$ is the dispersion slope at wavelength $\lambda$ and length z, $\eta$ is the factor by which the dispersion ratio can differ from the optimal value $D(\lambda_C,0)/D(\lambda_C,L)$. The factor $\eta$ also represents the factor by which the output pulse widths differ across the wavelength band. Equation (5) can be rewritten in terms of the difference between the initial and final dispersion slopes:

$$[(1-\eta)S(\lambda_C,L)D(\lambda_C,0)/D(\lambda_C,L)]-S(\lambda_C,0)<D(\lambda_C,0)\eta/(\lambda_C-\lambda_E) \qquad (6)$$

Assuming that the system can tolerate at 10% difference in dispersion, then $1-\eta$ equals 0.9. Further assume as in the previous example that $(\lambda_C-\lambda_E)$ equals 20 nm, $D(\lambda_C,0)$ equals 10, and $D(\lambda_C,L)$ equals 1.55. Then equation (6) reduces to:

$$|5.8\ S(\lambda_C,L)-S(\lambda_C,0)|<0.05 \qquad (6')$$

If there is no slope change, then $S(\lambda_C,0)=S(\lambda_C,L)<0.01$. If $S(\lambda_C,0)=0.03$ then $S(\lambda_C,L)<0.014$, and if $S(\lambda_C,0)=0.07$ then $S(\lambda_C,L)<0.02$. Also, a larger target dispersion ratio lowers the upper limit on the final dispersion slope. For most cases of practical interest, this broadband criterion sets a final slope limit somewhere between 0.01 and 0.02 ps/nm²/km.

A second slope-limiting criterion arises from distortion of short pulses caused by third-order dispersion. A third-order dispersive length (analogous to the second order dispersive length previously defined) is useful:

$$L_D=T_o^3/|\beta_3| \qquad (7)$$

where $\beta_3=-\lambda^4 S/(2\pi c)^2$. Because the pulse width and dispersion slope are functions of distance, the equation in dispersion-decreasing fiber becomes:

$$L_D=<T_o>^3/|<\beta_3>| \qquad (8)$$

where $<T_o>=T_o(0)(1-e^{-\rho L})/\rho L$, $<\beta_3>=(0)(1-e^{-bL})/bL$, and ρ and b are the exponential decay rates of the pulse width and dispersion slope, respectively. For the third order effects to be negligible, the fiber length L must be much less than the third order dispersive length (L<<L'$_D$). A factor of ten is sufficient (10 L<L'$_D$). For an 8 ps initial pulse width, a 10 km fiber, and dispersion changing from 10 to 1.55, the average slope should thus be less than 0.09 ps/nm$^2$/km (which is not a significant restriction). However, the cubed pulse width dependence greatly restricts shorter pulse compression. For example, the average slope of a 5 ps pulse should be less than 0.022. In addition, if the dispersion drop is from 10 to 1, then the 5 ps slope becomes 0.013. Values of dispersion slope at the low dispersion end of the fiber should be lower than 0.025 ps/nm$^2$-km to meet the slope criterion for most practical optical signal transmission applications.

SUMMARY OF THE INVENTION

The present invention provides a dispersion-varying, pulse-reshaping optical fiber having a large change in dispersion with respect to change in core diameter, and very low dispersion versus wavelength slope. The zero dispersion diameter is close to the zero dispersion slope diameter. Consequently, the dispersion and dispersion slope characteristics are such that the fiber enables optical transmission of information at extremely high data rates and a large number of wavelength channels.

The pulse-reshaping fiber also has a relatively small effective area, A$_{eff}$, and requires less input power to produce a desired output power.

The pulse-reshaping optical fiber includes a core surrounded by a cladding layer of refractive index n$_c$. The outside diameter of the core changes, preferably monotonically, along the length of the fiber. The core includes at least two radially-adjacent regions, a central region having a maximum refractive index n$_1$, and a moat region adjacent to the core region. The central region has a positive value of $\Delta_1$, and the moat region has a value of $\Delta_2$ not greater than $-0.1\%$. The moat region advantageously affects the change in dispersion with respect to fiber cladding diameter, as well as providing the fiber with low dispersion versus wavelength slope. The slope in the 1550 nm operating window (measured between 1500 and 1600) at the small diameter end of the fiber is preferably less than 0.025 ps/nm$^2$-km.

The value of $\Delta_1$ can be between 0.4% and 1.5%, but is preferably between 0.7% and 1.2%. The preferred value of $\Delta_2$ is in the range of $-0.2\%$ to $-0.6\%$. For pulse-reshaping optical fibers having a silica cladding, this range of $\Delta_2$ can be achieved by forming the moat region from silica doped with fluorine. The moat can also be formed from silica if the cladding layer is silica doped with an agent which decreases the refractive index. An agent which increases the refractive index can also be employed in the cladding when the moat contains fluorine.

The core can include an optional ring region of maximum refractive index n$_3$ that is disposed radially outward from the moat region. The optional ring region can have a maximum refractive index n$_3$ such that the condition 0%<$\Delta_3$<0.5% is satisfied.

Various characteristics of the pulse-reshaping fiber can be optimized to provide desired dispersion and dispersion slope properties. For example, if the central region has an α-type graded-index profile, α should be greater than 1. Moreover, it is preferred that the ratio of the radius of the inner core to the radial width of the moat be in the range defined by the relationship 0.67<a/b<2.

The length of the pulse-reshaping fiber depends on certain parameters including the pulse characteristics. The preferred fiber length L is given by 2 L$_D$<L<10 L$_D$, where L$_D$ is the dispersive length, as previously discussed. Moreover, the length L of the pulse-reshaping fiber should be no more than one tenth of L$_D$', the third order dispersive length.

The pulse-reshaping fiber of the present invention can be employed at various locations in an optical transmission system, primarily at an interfaces with one of the ends of an optical transmission line. For example, the pulse-reshaping fiber can comprise a pulse compressor connected between a modulated light pulse source and the transmission line. In a WDM system, the light pulse source can be a multiplexer having a plurality of input lines for receiving optical signals of different wavelengths, and the pulse compressor fiber is connected to the multiplexer output line. Such a WDM system can include a plurality of optical signal transmitters, each of which is connected to a respective input line. Because of the low dispersion slope of the pulse compressor fiber, transmitters capable of generating optical pulses at a data rate of at least 10 Gb/s can be employed. Such a fiber is therefore of great value in high pulse rate WDM optical transmission systems.

When the optical transmission system is designed to operate at a given band of wavelengths, $\lambda_L$, $\lambda_H$, and $\lambda_M$ (the low end, high end, and middle wavelength of the band, respectively), the ratio of input to output dispersion at either $\lambda_L$ or $\lambda_H$ should be within 10% of the ratio of input to output dispersion at $\lambda_M$.

The pulse-reshaping optical fiber is optionally located at the output end of a light-transmitting system, where it is connected between the transmission line and the light-receiving device or detector. A further optional location for such a pulse-reshaping fiber is along the transmission line itself, where it is connected to the output of an optical pulse regenerator, amplifier, or other active or passive signal-manipulating or signal-routing component.

DETAILED DESCRIPTION OF THE PREFERRED EMBODIMENTS

The pulse-reshaping fiber 26 of this invention is shown and described below in detail with reference to the attached drawing Figures, and as used in association with various embodiments of an optical transmission system 20.

The following terms and symbols are used herein to characterize features of the present pulse-reshaping fiber 26 and optical transmission system 20. The term "Δ" (delta) indicates the relative refractive indices between various regions of the pulse-reshaping fiber 26, and "n" indicates a particular refractive index for a given region. Thus, for two regions of different maximum indices of refraction $n_x$ and $n_c$, the value of $\Delta_x$ equals $(n_x^2 - n_c^2)/2n_x^2$.

Figure 2:
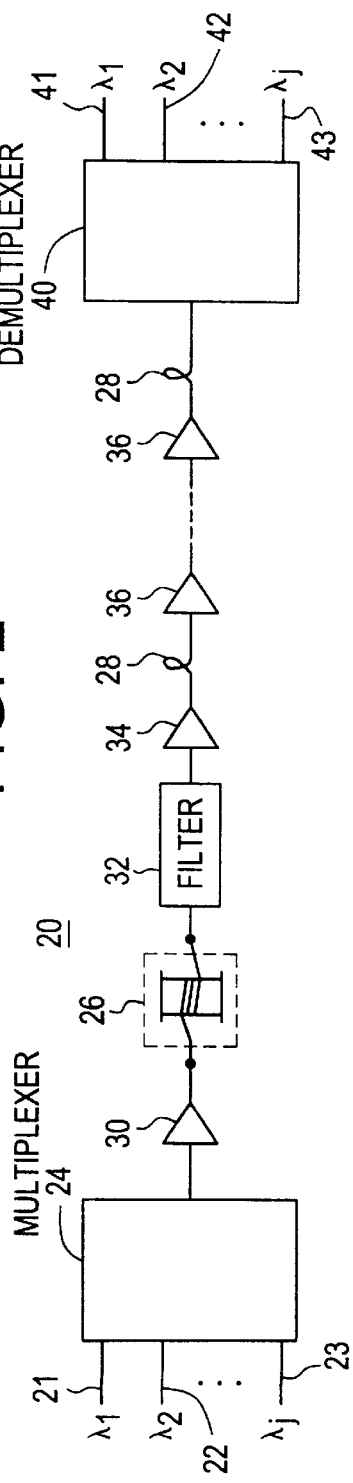
FIG. 2 schematically illustrates a wavelength-division-multiplexed (WDM) optical transmission system according to one embodiment employing the pulse-reshaping fiber of this invention.

The pulse-reshaping optical fiber 26 of this invention is especially suitable for use in an optical transmission system 20 such as that shown in FIG. 2. Depicted in FIG. 2 is a wavelength-division-multiplexed (WDM) optical transmission system 20 according to one embodiment of the invention. System 20 includes a plurality of optical input lines 21, 22, 23 each propagating a return-to-zero (RZ) pulsed optical signal at a specific wavelength $\lambda_1, \lambda_2 \ldots \lambda_j$, respectively. As few as one input channel could be employed, and the maximum number of wavelengths is limited by transmission system parameters such as channel spacing, channel bandwidth, fiber amplifier bandwidth, and the like. Each channel is the output from an optical transmitter (not shown) that emits an information-bearing optical signal at one of the specific channel wavelengths. Each optical transmitter generally includes a laser, a laser controller, and a modulator.

Typically, the wavelengths emitted by optical transmitters are selected to be within the 1500 nm window, the range in which the minimum signal attenuation occurs for silica-based fibers. More particularly, the wavelengths emitted by the optical transmitters are selected to be in the range from about 1530 nm to about 1610 nm. However, the optical transmitter wavelengths can be selected to correspond to the gain characteristics of the transmission line amplifiers. Consequently, when using amplifiers with a gain spectrum in a different region, the wavelengths of the optical transmitters are selected to be within that gain region.

Each of the signals appearing at lines 21, 22, 23 constitutes a channel in optical system 20, the wavelength of which corresponds to a demultiplexer wavelength at the receiving end of the system. The optical signal channels on lines 21, 22, 23 are brought together in an optical combiner or multiplexer 24, and the combined signals are transmitted over optical transmission fiber 28.

System 20 includes a single-mode pulse-compression fiber 26 which enables an increase in the bit rate of each of the channels. Fiber 26 is shown as being coiled on a reel, since that is the conventional disposition of a pulse compression fiber. It could also be deployed as the first fiber in a transmission link. To compensate for losses at the multiplexer, fiber amplifier 30 can be inserted into the system between multiplexer 24 and pulse compression fiber 26. To compensate for losses in pulse compression fiber 26 and to adjust the input power in 26, fiber amplifier 34 can be inserted into the system between fiber 26 and transmission fiber 28. A comb filter 32 is optionally employed in the line between fiber 26 and amplifier 34. Filter 32 may consist of a Fabry-Perot filter, the pass bands of which are centered at the channel wavelengths.

Any optical waveguide fiber that is capable of propagating multiple optical wavelengths can be employed as transmission fiber 28. Exemplary fibers are (a) conventional single-mode optical fiber such as SMF-28, available from Corning Incorporated, (b) dispersion managed fiber composed of many alternating pieces of fibers of high and low anomalous dispersion, (c) a soliton propagation fiber such as that disclosed in U.S. Pat. No. 5,579,428, and (d) conventional dispersion shifted fiber. Fiber amplifiers 36 are appropriately spaced along transmission fiber 28 as needed.

The multi-channel signal is received by demultiplexer 40 which divides the signal into a plurality of channels at wavelengths $\lambda_1, \lambda_2 \ldots \lambda_j$ which are propagated over lines 41, 42, 43 to optical receivers (not shown).

Figure 3A:
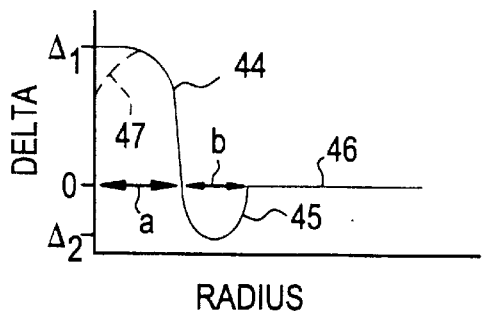
FIGS. 3(a), 3(b) and 3(c) are exemplary refractive index profiles of the pulse-reshaping fiber of this invention.
Figure 3C:
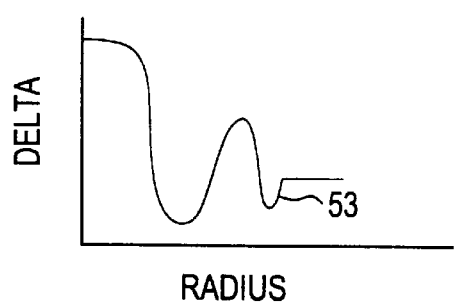

A feature of this invention is the utilization in system 20 of an optical fiber 26 having a core diameter that monotonically varies from one end to the other and having a refractive index profile the minimum requirements of which are illustrated in FIG. 3(*a*). The fiber core must include a central region 44 and a moat region 45 situated radially adjacent central region 44. The central region 44 can have an index maximum at the center of the fiber as represented by solid line 44, or it can have an index depression at the fiber center as represented by dashed line 47. The remainder of the fiber can consist of a cladding layer 46. The refractive index deltas of central region 44 and moat region 45 are $\Delta_1$ and $\Delta_2$, respectively. A salient feature of the fiber core is the magnitude of $\Delta_2$, which must not be greater than −0.1%, and which is preferably defined by the range −0.2%>$\Delta_2$>−0.6%. Values of $\Delta_2$ which are in this range result in such advantageous effects on a pulse-reshaping fiber as low dispersion slope, increased sensitivity of dispersion with respect to fiber outside diameter, and smaller fiber mode field diameter.

The value of $\Delta_1$ can be between 0.4% and 1.5%, but it is preferred that $\Delta_1$ be between 0.7% and 1.2%. Larger values of $\Delta_1$ result in a smaller mode field diameter, and improved bend loss performance. However, if $\Delta_1$ increases, $\Delta_2$ must correspondingly become more negative in order to achieve the desired dispersion and dispersion slope properties.

The core of the pulse-reshaping optical fiber 26 can have a profile such as that shown in FIG. 3(*b*), which includes central region 50, moat region 51, and a ring region 52 disposed radially outwardly from and adjacent to the moat region 51. The ring region 52 has a maximum refractive index $n_3$ of such a value that it has a positive value of $\Delta_3$ that is in the range defined by the relationship defined by the relationship 0%<$\Delta_3$<0.5%. The presence of the ring improves bend performance, but it only has a minor influence on dispersion and dispersion slope.

The core could have four or more regions of alternating positive and negative delta for the purpose of effecting minor tuning of fiber properties. FIG. 3(*c*) shows that in addition to the previously-described core regions 50, 51, and 52, the core could optionally include a further moat region 53 of negative delta.

One embodiment of refractive index profile of the central region 50 can be characterized as a graded-index profile defined by the equation $n(r)=(n_1-n_c)[1-(r/a)^\alpha]+n_c$ for values of r equal to or greater than the central core radius a (see FIG. 3a). Although any value of $\alpha$ greater than unity is contemplated to be useful, preferred designs have $\alpha$ values sufficiently greater than one in order to achieve low dispersion slope. For a given set of fiber parameters, if $\alpha$ is made larger, $\Delta_2$ should be made correspondingly more negative to maintain the dispersion properties.

Referring to FIG. 3(a), it has been observed that the ratio of inner core radius a to the radial width b of the moat region 51 should be in the range defined by the relationship, 0.6<a/b<2 in order to achieve best results. As the ratio a/b increases above 2, very little slope flattening occurs. As the ratio a/b decreases below 0.67, propagation problems are encountered whereby high loss occurs at wavelengths around 1550 nm.

Figure 3B:
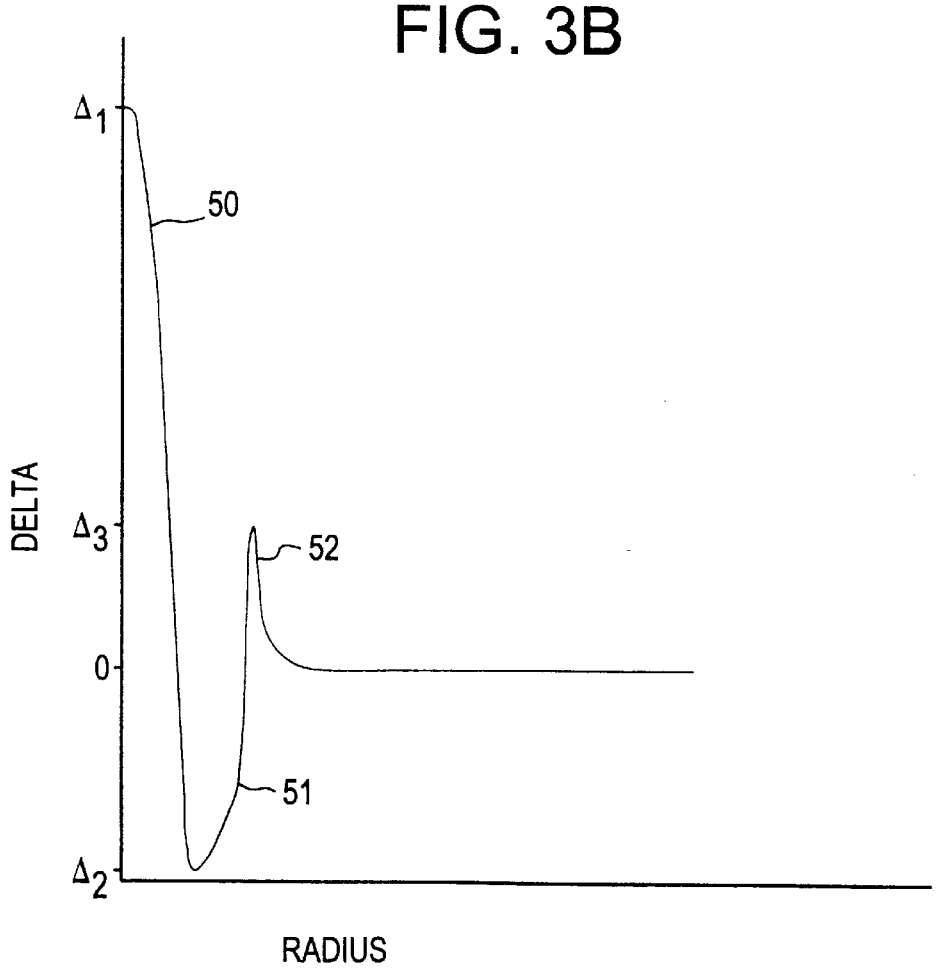

An optical fiber 26 according to FIG. 3(b) having core region index deltas within the above ranges can be formed from silica, germania, and fluorine, the central region 51 and ring region 52 being formed of silica doped with germania, and the moat region 51 being formed of fluorine-doped silica. A silica core rod is formed by a conventional technique involving the deposition of germania-doped soot on a mandrel. The germania concentration is decreased with increasing radius to provide the desired index profile. A few passes of pure silica soot are deposited last; this very thin silica layer is undetectable in the resultant fiber. The mandrel is removed, and the resultant porous preform is dried and consolidated. The consolidated preform is inserted into a fluorine-doped silica tube, and the resultant assembly is redrawn under vacuum to form a preliminary core rod having an outside diameter of 8 mm. Germania-doped soot is deposited on a 9.5 mm alumina mandrel to form the ring portion, and a coating of silica particles is deposited to form a portion of the cladding layer. The mandrel is removed to form a porous preform into which the preliminary core rod is inserted. This assembly is dried and consolidated and is then redrawn to an outside diameter of 10.5 mm to form a solid glass preform, the refractive index of which is depicted in FIG. 3(b). The solid glass preform is overclad with additional silica soot, dried and consolidated to form a draw blank which is drawn into optical fiber having an axially varying diameter. The amount of overclad that is applied determines the dispersion and dispersion slope at any given fiber diameter. Changing the outer fiber diameter along the length of the fiber 26 changes the core radius to easily achieve the required range of optical properties for pulse-reshaping.

The starting and ending fiber diameters can be selected to be larger and smaller, respectively, than 125 μm, the standard fiber diameter. This would be done so that the starting and ending portions of the fiber would not have diameters that differed to too great an extent from 125 μm. Alternatively, there may be some reason to make the starting or the ending diameter 125 μm.

Alternatively, a fiber preform could be made in accordance with the teachings of U.S. Pat. No. 5,504,829, incorporated herein by reference as though fully set forth, whereby a drawn fiber has a constant outside diameter and a decreasing core diameter.

In the method described above for making the improved dispersion-varying fiber, fluorine is employed to provide the low refractive index delta moat region 45 of the fiber 26, and the cladding 46 consists of silica. If the cladding 46 included a refractive index increasing dopant such as germania, less fluorine would be required in the moat region 45 to achieve a given value of $\Delta_2$. Moreover, additional germania would need to be added to the central region 50 and the ring region 52 in order to maintain the values of $\Delta_1$ and $\Delta_3$. If sufficient amounts of germania were added to the other core regions, the moat region 51 could be formed of pure silica. Moreover, there are other refractive index increasing dopants that could be employed instead of $GeO_2$.

EXAMPLE

A fiber 26 having a refractive index profile as shown in FIG. 3(b) can be formed such that $\Delta_1$ is 1.0%, $\Delta_2$ is −0.4%, and $\Delta_3$ is 0.25%. The central region 44 has a gradient index profile wherein α is about 2. At the large diameter end of the fiber, the central core radius (dimension a in FIG. 3a) is about 3.05 μm, the outer radius of the moat (the sum of dimensions a and b in FIG. 3a) is about 7 μm, and the outer radius of the ring is about 8.5 μm. The outside diameter of the fiber exponentially decreases from 130 μm to 115 μm. At the large diameter end, the dispersion is +10 ps/nm-km st 1550 nm, and the dispersion slope at 1550 nm is 0.03 ps/nm²-km (measured between 1500 and 1600 nm). At the small diameter end the dispersion is +1 ps/nm-km, and the dispersion slope is 0.003 ps/nm²-km. The path average dispersion of the 12 km tapered diameter fiber is 3.5 ps/nm-km, and the average dispersion slope is 0.01 ps/nm²-km. If a different amount of the soot overcladding material is applied to the fiber preform during the fabrication process, the start and ending outside diameters will shift, but the change in diameter from one end to the other (in this case 15 μm) would be maintained constant.

The profile of the specific example provides lower initial dispersion slope than the aforementioned prior DS fiber. The initial dispersion slopes of the fiber of the specific example and the prior DS fiber are 0.022 and 0.08 ps/nm²-km, respectively. Moreover, the dispersion slope of the fiber of the specific example decreases to near zero along its length as the dispersion decreases for pulse compression.

Figure 1A:
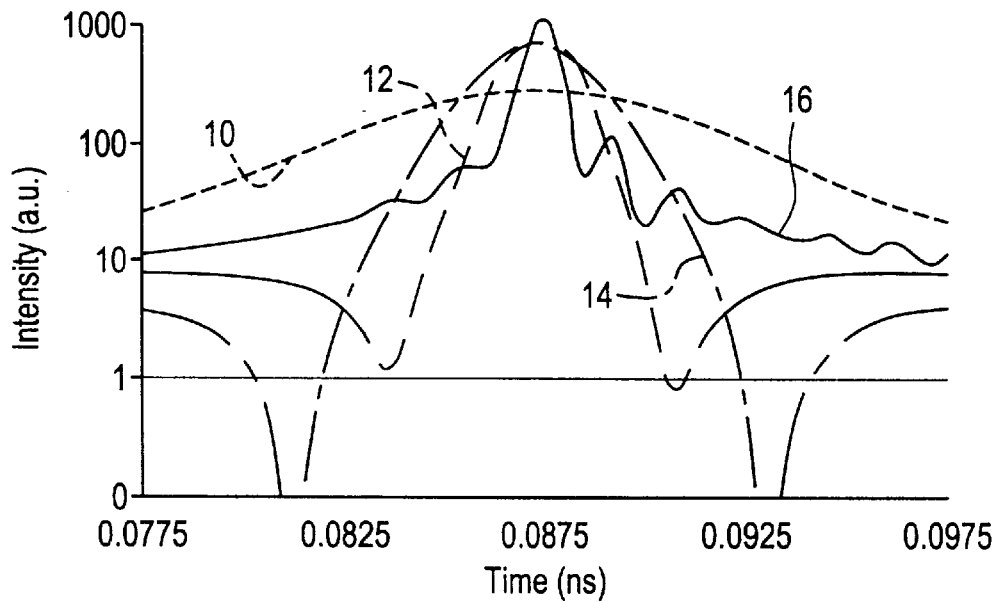
FIG. 1(a) is a logarithmic scale graph plotting the temporal output intensity of a soliton pulse for a prior art dispersion-shifted, dispersion-varying fiber.
Figure 1B:
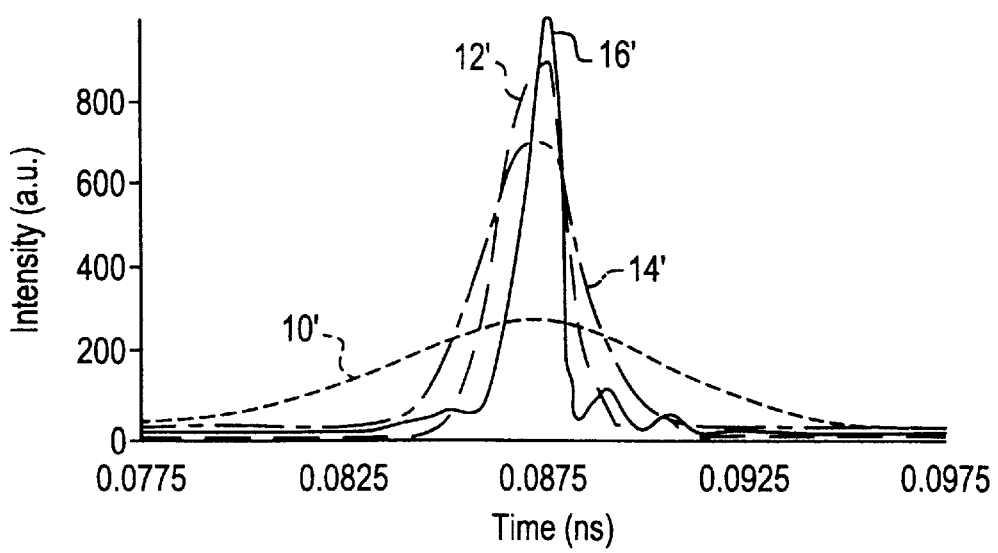
FIG. 1(b) is a linear scale graphs plotting the temporal output intensity of a soliton pulse for the prior art dispersion-shifted, dispersion-varying fiber of FIG. 1.
Figure 4A:
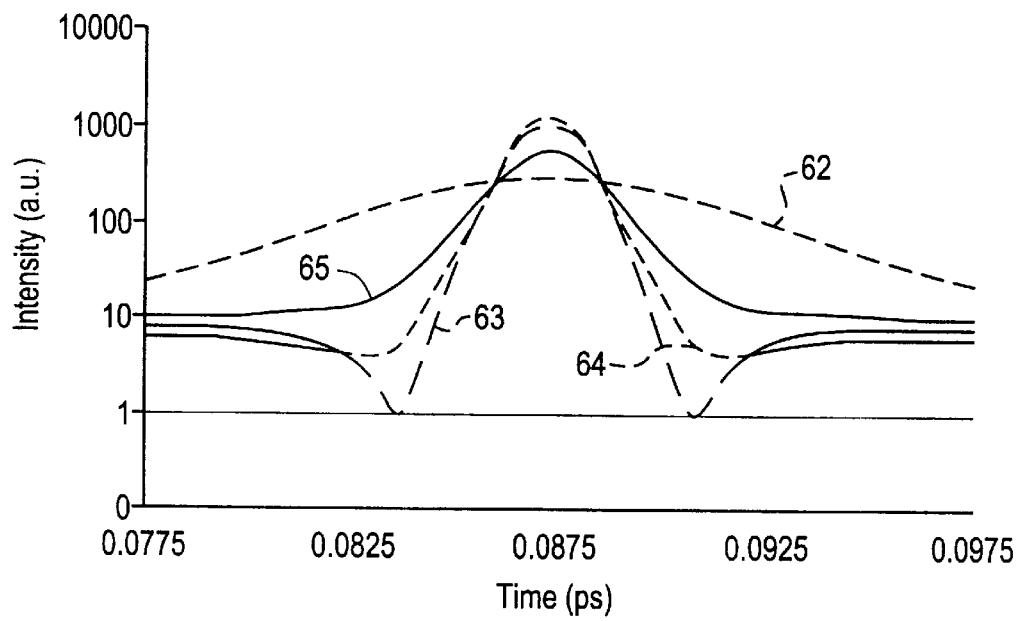
FIG. 4(a) is a logarithmic scale graph plotting the temporal output intensity of a soliton pulse for a dispersion varying fiber of the present invention, with dispersion slope linearly decreasing from 0.03 to 0.0 ps/nm$^2$-km.
Figure 4B:
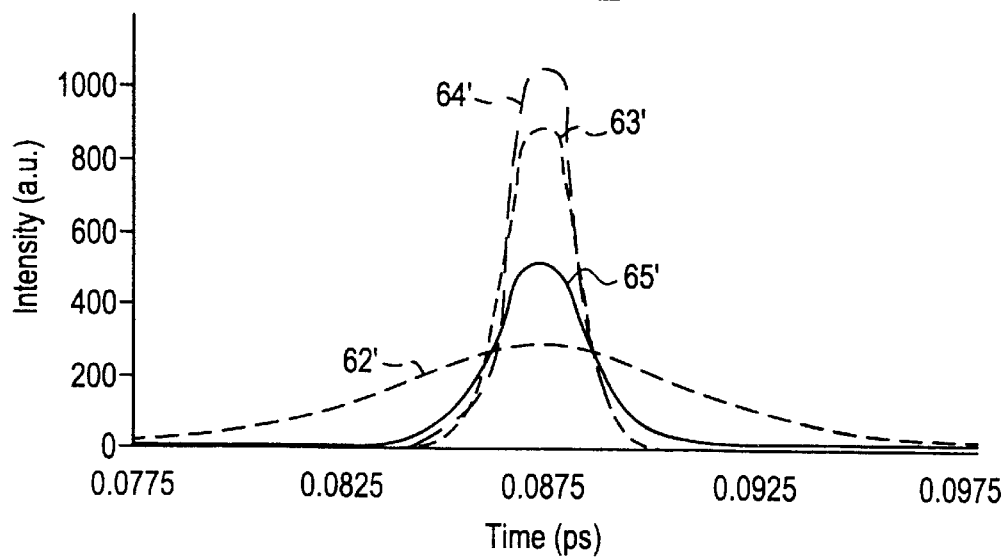
FIG. 4(b) is a linear scale graph plotting the temporal output intensity of a soliton pulse for a dispersion varying fiber of the present invention, with dispersion slope linearly decreasing from 0.03 to 0.0 ps/nm$^2$-km.

To illustrate the broadband characteristic of the fiber of the specific example, the pulse-reshaping example of the prior DS fiber (FIG. 1) is repeated in FIG. 4 for the fiber of the specific example. The output pulses at 1550 nm, 1570 nm, and 1530 nm are represented by curves 63, 64, and 65, respectively. The input pulse 62 is plotted for comparison. The dispersion variation is the same 10 to 1.55 ps/nm-km dispersion variation as shown in FIG. 1, but the dispersion slope now varies from 0.03 to 0.0 ps/nm²-km linearly along the 10 km length of fiber 26. While the peak power at each wavelength are different, the pulse width is nearly wavelength independent with 2.7 ps, 2.0 ps, and 1.99 ps for 1530 nm, 1550 nm, and 1570 nm, respectively. The larger difference at short wavelengths is due to the greater absolute change in ratio of input to output dispersion. It is also evident from the temporal plots in FIG. 4 that the pulses have nearly the same shape, and are much less distorted than those in FIG. 1. The numerically-derived FIGS. 1 and 4 confirm the broadband wavelength operation of the low dispersion slope fiber profiles of this invention. Fibers having such profiles are therefore eminently suitable for use as pulse compressors.

Figure 5:
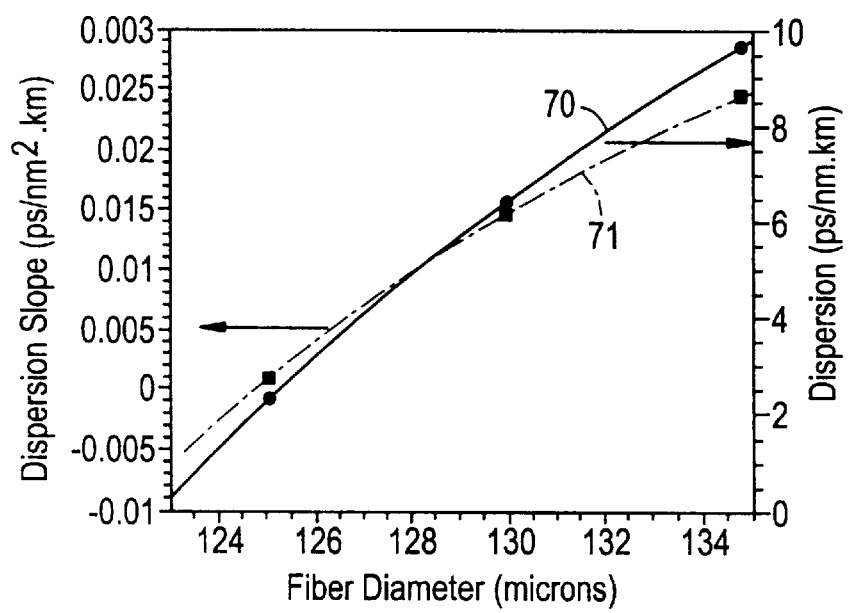
FIG. 5 is a graph showing the relationship between dispersion and dispersion slope for different values of fiber outside diameter.

Similar fibers having the improved type of core index profile can be drawn to different outside diameters (and thus different core diameters) as shown in FIG. 5. This profile is derived from fibers with dispersions ranging from about 0 to about +9.7 ps/nm-km, and corresponding slopes from −0.005 to +0.025 ps/nm²-km. The relationship between dispersion and fiber diameter is represented by curve 70. Dispersion slope versus diameter is plotted as curve 71.

Note in FIG. 5 the approximately linear relationship for both dispersion and dispersion slope compared to fiber diameter. Also note that the diameter corresponding to zero dispersion is near the diameter corresponding to zero slope. This relationship is advantageous in that at the fiber length when the pulse width is small, the dispersion slope is extremely low, thereby enabling pulse shape to be retained.

The zero-crossing diameters of curves 70 and 71 can be moved to the left, for example, by adding additional overclad material to the core preform. This causes the core diameter to be smaller for all values of fiber outside diameter.

Figure 6:
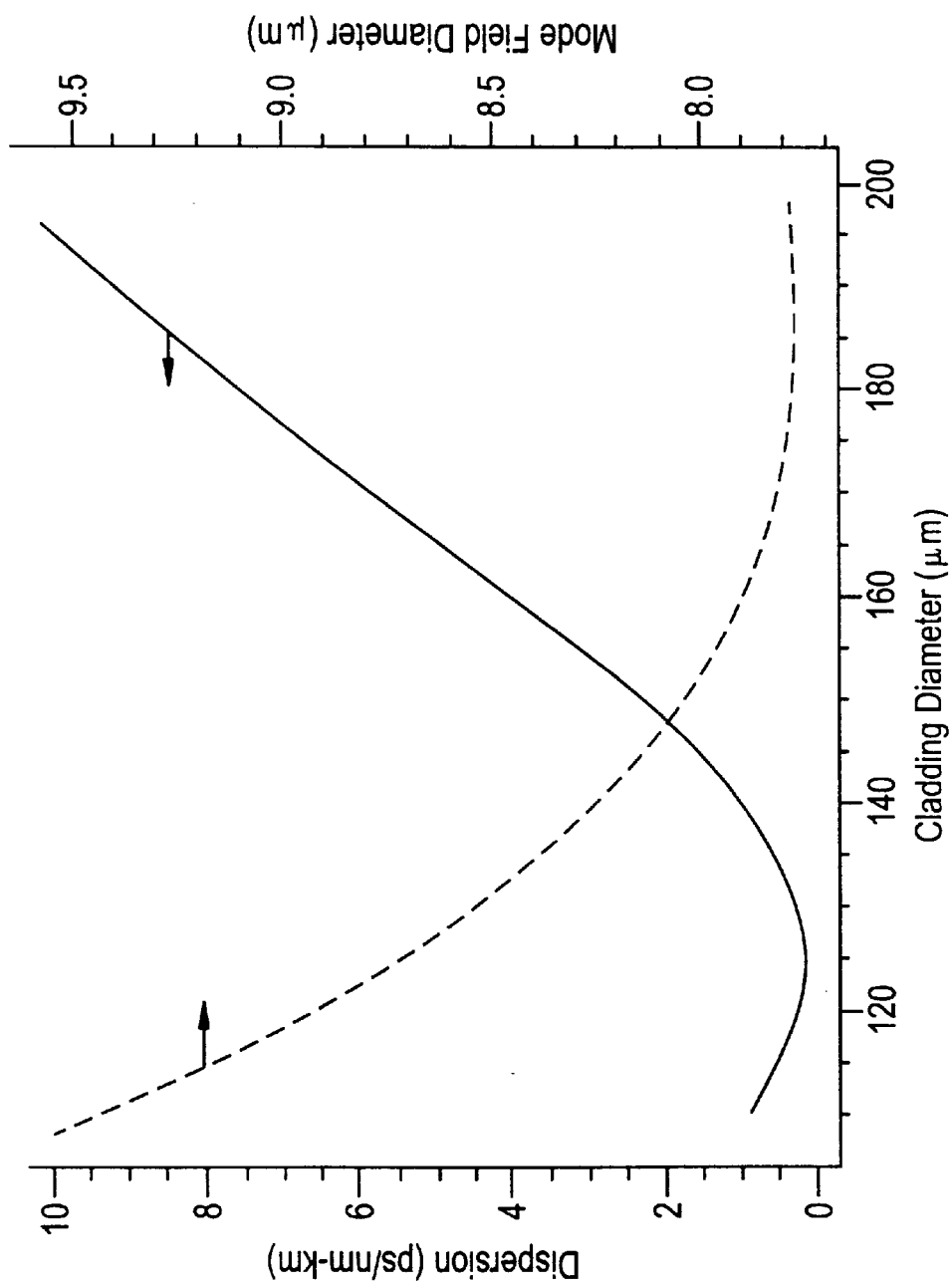
FIG. 6 is a graph showing the variation of dispersion and mode field diameter as a function of cladding diameter for a prior art dispersion-decreasing, dispersion-shifted (DS) fiber.

There are several additional advantages of employing profiles of the type shown in FIG. 3. The first is evident from a comparison of FIGS. 5 and 6. FIG. 6 is a plot of dispersion versus cladding diameter for a prior art DS fiber of the type previously described. FIG. 5 shows that a dispersion change of 9.2 ps/nm-km is achieved in only 10 μm of diameter change for the FIG. 3(*b*) type profile. In contrast, FIG. 6 shows that for a fiber having a dispersion-shifted profile, nearly 75 μm of diameter change is needed to achieve the same dispersion change. Such large diameter changes require the ends of a pulse-reshaping fiber to be much larger (and/or much smaller) than a standard 125 μm diameter. Fibers become more difficult to handle as one moves away from the nominal 125 μm cladding diameter. For smaller diameters, microbending becomes an issue. For larger diameters, the fibers become rigid and break easily. For diameters larger and smaller than 125 μm, splicing to standard 125 μm diameter fiber becomes more difficult.

Figure 7:
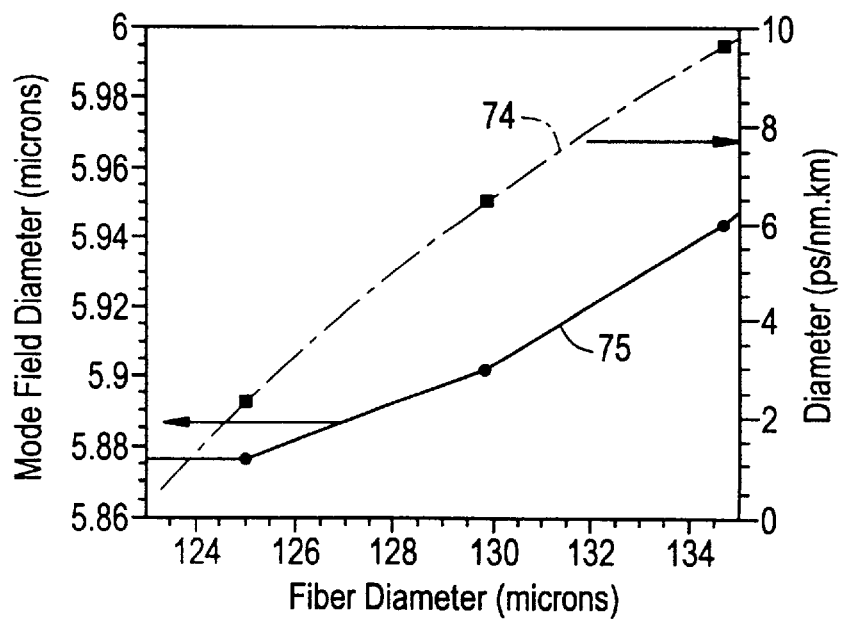
FIG. 7 is a graph showing the variation of dispersion and mode field diameter as a function of cladding diameter for the pulse-reshaping fiber of the present invention.

FIG. 6 also shows that the mode field diameter of prior art DS fiber varies from 7.9 to 9.5 μm as dispersion varies from 10 to 1 ps/nm-km. FIG. 7, which also shows dispersion and mode field diameter plotted in curves 74 and 75, respectively, as a function of cladding diameter, is derived from numerically generated data based on a fiber of the type illustrated in FIG. 3(*b*). Curve 75 of FIG. 7 shows that the mode field diameter of a fiber similar to that described in the specific example varies from 5.94 to 5.88 μm for the same dispersion range. The most important advantage of having little variation in mode field diameter is that it greatly simplifies design. Large changes in mode field diameter require a more complicated dispersion function along the fiber length.

Another advantage of fibers having index profiles of the type represented by this invention and FIG. 3 is the smaller effective area, $A_{eff}$, which is typically 25 to 30 μm$^2$. Smaller effective area corresponds to more efficient self phase modulation for a given power level. The launch peak power required for pulse compression is near the fundamental soliton power $P_o$, where $$P_o = \beta_2/\gamma T_o^2 \tag{9}$$

where $\beta_2$ is fiber dispersion (in ps$^2$/km), $\gamma = 2\pi n_2/A_{eff}$ (the nonlinear coefficient), $n_2$ is the nonlinear refractive index, and $T_o$ is the characteristic pulse width (in ps). At slightly higher power, there will be a small residual amount of uncompensated self phase modulation. Continuing with the above specific example, the average launch power into the new fiber for a 40 Gb/s pseudo-random data stream is 17.8 dBm. Average launch power would be 3 dB higher for a dispersion-shifted fiber, for which $A_{eff}$ is 50 μm$^2$, and it would be 5.3 dB higher for a standard, non-zero dispersion-shifted fiber for which $A_{eff}$ is 85 μm$^2$.

Figure 8:
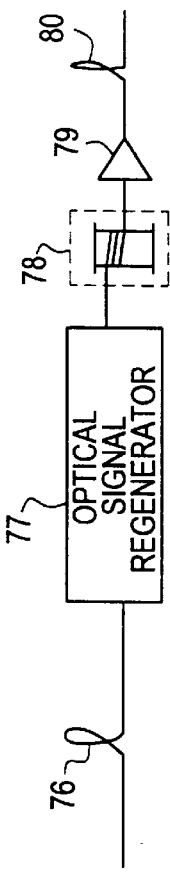
FIG. 8 schematically illustrates an optical signal regenerator employing the pulse-reshaping fiber of this invention.

Pulse compression fibers can also be used to decrease pulse width at the output of a regenerator located at some point along an optical transmission line. FIG. 8 shows a regenerator 77 connected to the output end of a transmission fiber 76. If the temporal pulse widths of the signals emanating from regenerator 77 are too wide for the desired system bit rate, a pulse compressor 78 of the type described in conjunction with FIG. 2 can be employed to connect the regenerator to a further transmission fiber 80. Amplifier 79 can be used in the line connecting compressor 78 to transmission line 80. Alternatively, pulse compressor 78 could be located within or before the regenerator 77.

Figure 9:
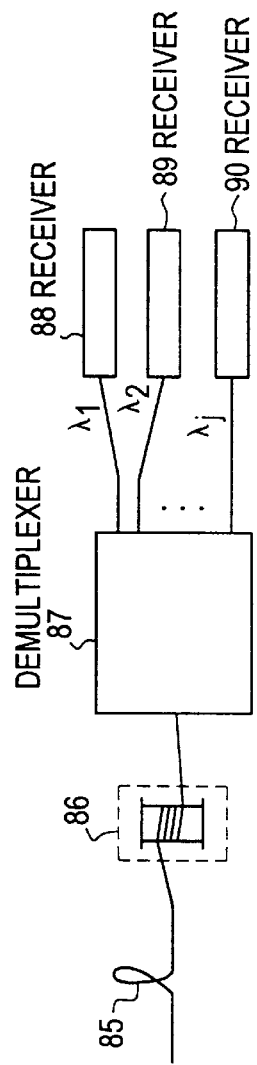
FIG. 9 schematically illustrates the use of the dispersion-decreasing fiber of this invention as a pulse expander.

The pulses transmitted through the above described optical transmission systems are very narrow. In the event that pulses broader than the transmitted pulses are required to activate the receivers 88, 89, 90, a pulse expander fiber 86 can be employed to connect transmission fiber 85 to demultiplexer 87, as shown in FIG. 9. As described above, a pulse expander fiber is one in which the dispersion increases with length. When a fiber of the type described in conjunction with FIG. 3 is used as the pulse expander fiber, the low dispersion slope enables broadband operation.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A pulse-reshaping optical fiber having a length, said pulse-reshaping fiber comprising:

a core surrounded by a cladding layer, said core having a first end, a second end, a diameter, and a refractive index $n_c$, said diameter of said core monotonically changing along the length of the pulse-reshaping fiber from said first end to said second end, said core defining a central region having a maximum refractive index $n_1$ and a moat region disposed radially adjacent to said central region, said moat region having a minimum refractive index $n_2$, said central region having a positive relative refractive index $\Delta_1$, and said moat region having a relative refractive index $\Delta_2$ not greater than −0.1%, where said relative refractive index $\Delta_1$ associated with said central region equals $(n_1^2 - n_c^2)/2n_1^2$, and said relative refractive index $\Delta_2$ of said moat region equals $(n_2^2 - n_c^2)/2n_2^2$.

2. The pulse-reshaping optical fiber of claim 1 wherein the value of $n_2$ satisfies the condition that $-0.2\% > \Delta_2 > -0.6\%$.

3. The pulse-reshaping optical fiber of claim 1 wherein $\Delta_1$ is between 0.4% and 1.5%.

4. The pulse-reshaping optical fiber of claim 3 wherein $\Delta_1$ is between 0.7% and 1.2%.

5. The pulse-reshaping optical fiber of claim 1 further comprising:

a ring region disposed radially outwardly from and adjacent to the moat region, said ring region having a maximum refractive index $n_3$ of such a value that said ring region has a relative refractive index $\Delta_3$ which is positive, where said relative refractive index $\Delta_3$ of said ring region equals $(n_3^2 - n_c^2)/2n_3^2$.

6. The pulse-reshaping optical fiber of claim 5 wherein the relative refractive index $\Delta_3$ satisfies the condition $0\% < \Delta_3 < 0.5\%$.

7. The pulse-reshaping optical fiber of claim 1 wherein the relative refractive index $\Delta_1$ is greater than the relative refractive index $\Delta_3$.

8. The pulse-reshaping optical fiber of claim 1 wherein the central region has a radius a and a gradient refractive index of the type defined by the equation $n(r) = (n_1 - n_c)[1 - (r/a)^\alpha] + n_c$ for values of r equal to or greater than said radius a, wherein $\alpha > 1$.

9. The pulse-reshaping optical fiber of claim 1 wherein the central region has a radius a and the moat region has a radial width b, and the ratio of said radius a to said radial width b satisfies the relationship $0.67 < a/b < 2$.

10. The pulse-reshaping optical fiber of claim 1 having a dispersion slope and a small diameter end, wherein said dispersion slope at said small diameter end is less than 0.025 ps/nm$^2$-km at 1550 nm.

11. The pulse-reshaping optical fiber of claim 1 having a dispersive length $L_D$ described by the formula $(T_o^2/|\beta_2|)$ and a length L satisfying the condition 2 $L_D$<L<10 $L_D'$.

12. The pulse-reshaping optical fiber of claim 1 having a third order dispersion length $L_D'$ and a length L at least about 10 times less than said third order dispersion length $L_D'$.

13. The pulse-reshaping optical fiber of claim 1 wherein the moat region is formed from fluorine-doped silica.

14. The pulse-reshaping optical fiber of claim 1 wherein the moat region is formed of silica, and the cladding layer is formed from silica doped with a refractive index increasing dopant.

15. The pulse-reshaping optical fiber of claim 1 wherein the moat region is formed from fluorine-doped silica, and the cladding layer is formed from silica doped with a refractive index increasing dopant.

16. A pulse-reshaping optical fiber having a length, said pulse-reshaping fiber comprising:
a core surrounded by a cladding layer, said core having a refractive index $n_c$, a first end, a second end, and a diameter, said diameter of said core monotonically changing along the length of the pulse-reshaping fiber from said first end to said second end, said core defining at least three radially adjacent regions including a central region having a maximum refractive index $n_1$ and a relative refractive index $\Delta_1$, a ring region disposed radially outward relative to said central region, said ring region having a maximum refractive index $n_3$ and a relative refractive index $\Delta_3$, and a moat region disposed between said central region and said ring region, said moat region having a minimum refractive index $n_2$ and a relative refractive index $\Delta_2$, where said relative refractive index $\Delta_1$ of said central region equals $(n_1^2-n_c^2)/2n_1^2$, said relative refractive index $\Delta_2$ of said ring region equals $(n_2^2-n_c^2)/2n_2^2$, and said relative refractive index $\Delta_3$ of said moat region equals $(n_3^2-n_c^2)/2n_3^2$, wherein said relative refractive index $\Delta_1$ of said central region is between about 0.4% and about 1.5%, said relative refractive index $\Delta_2$ of said moat region is between about −0.2% and about −0.6%, and said relative refractive index $\Delta_3$ of said ring region is between about 0% and about 0.5%.

17. An optical transmission system comprising:
an optical transmission line having an end; and
a pulse-reshaping fiber operatively connected to said end of said transmission line, said pulse-reshaping fiber having core surrounded by a cladding layer, said core having a first end, a second end, a diameter, and a refractive index $n_c$, said diameter of said core monotonically changing along the length of the pulse-reshaping fiber from said first end to said second end, said core defining a central region having a maximum refractive index $n_1$ and a moat region disposed radially adjacent to said central region, said moat region having a minimum refractive index $n_2$, said central region having a positive relative refractive index $\Delta_1$, and said moat region having a relative refractive index $\Delta_2$ not greater than −0.1%, where said relative refractive index $\Delta_1$ associated with said central region equals $(n_1^2-n_c^2)/2n_1^2$, and said relative refractive index $\Delta_2$ of said moat region equals $(n_2^2-n_c^2)/2n_2^2$.

18. The optical transmission system of claim 17 wherein the pulse-reshaping fiber has an input end and an output end, the system further comprising:
a light pulse source operatively connected to the input end of the pulse-reshaping fiber, the transmission line being operatively connected to the output end of the pulse-reshaping fiber.

19. The optical transmission system of claim 18 wherein the light pulse source produces a plurality of optical signals within a predetermined band of wavelengths, including a low wavelength end $\lambda_L$, a high wavelength end $\lambda_H$, and a middle wavelength $\lambda_M$ of said band of wavelengths, the pulse-reshaping fiber exhibiting a first set of input dispersion values for each of said plurality of optical signals within said band of wavelengths at the input end, and a different set of output dispersion values for each of said plurality of optical signals within said band of wavelengths at the output end, a ratio of said input dispersion values to said output dispersion values at either said low wavelength end $\lambda_L$ or said high wavelength end $\lambda_H$ being within 10% of a ratio of said input dispersion values to said output dispersion values at said middle wavelength $\lambda_M$.

20. The optical transmission system of claim 18 wherein said light pulse source comprises:
a multiplexer having a plurality of input lines for receiving optical signals having different wavelengths, and a single output line that is connected to the pulse-reshaping fiber.

21. The optical transmission system of claim 20 further comprising:
a plurality of optical signal transmitters, each of said plurality of optical signal transmitters being operatively connected to a respective one of the plurality of input lines, said plurality of optical signal transmitters being capable of generating optical pulses at a data rate of at least 40 Ghz.

22. The optical transmission system of claim 17 further comprising:
a light receiving device, the pulse-reshaping optical fiber being operatively connected between said light receiving device and the transmission line.

23. The optical transmission system of claim 17 further comprising:
a second optical transmission line having an output end; and
an optical pulse regenerator operatively connected to said output end of said second optical transmission line, said optical pulse regenerator having an output, the pulse-reshaping fiber operating as a pulse compressor operatively connected to said output of said optical pulse regenerator.

* * * * *